United States Patent [19]

Arcand

[11] Patent Number: 4,782,788

[45] Date of Patent: Nov. 8, 1988

[54] LITTER BOX WITH HANDLE AND BLANK THEREFOR

[75] Inventor: Marcel Arcand, Montreal, Canada

[73] Assignee: Domta Inc., Montreal, Canada

[21] Appl. No.: 115,629

[22] Filed: Oct. 30, 1987

Related U.S. Application Data

[63] Continuation-in-part of Ser. No. 81,689, Aug. 5, 1987, abandoned.

[51] Int. Cl.[4] ............................................ A01K 29/00
[52] U.S. Cl. ........................................ 119/1; 229/139;
229/52 B
[58] Field of Search ............................ 119/1; 206/204;
229/139, 52 B

[56] References Cited

U.S. PATENT DOCUMENTS

| 4,014,292 | 3/1977 | Coughlin et al. | 119/1 |
| 4,498,590 | 2/1985 | Burdick | 229/52 B |
| 4,628,863 | 12/1986 | Etchenauer | 119/1 |

Primary Examiner—Robert Peshock
Attorney, Agent, or Firm—Antoine H. Gauvin

[57] ABSTRACT

A blank and box therefrom forming a shallow disposable litter box. The box has four wall panels extending into bottom panels fastened to form a bottom. The wall panels extend remote from the bottom panels into four top panels for forming a top sealing the box. Two opposite top panels have an aperture and handle cooperating to releasably lock the four top panels in a closed position and enable the box to be carried horizontally with one hand. One of the top panels, other than the two cooperating top panels, when in an open position preferably provides an opening for an entry and exit way for different-sized pets.

8 Claims, 3 Drawing Sheets

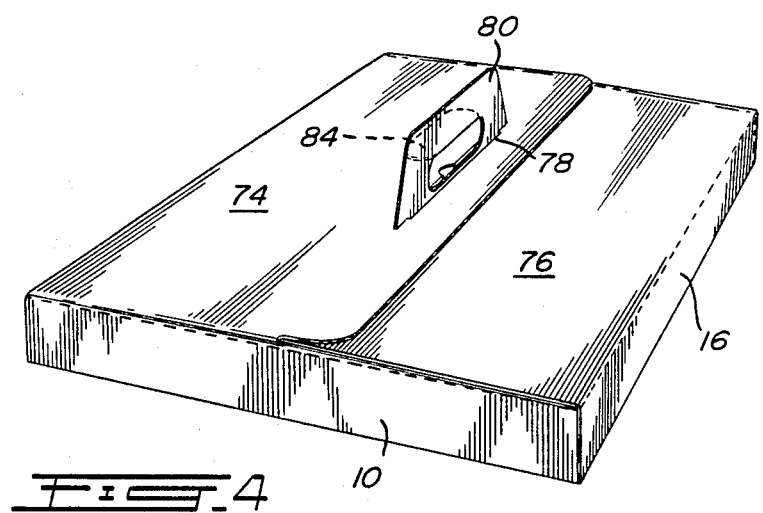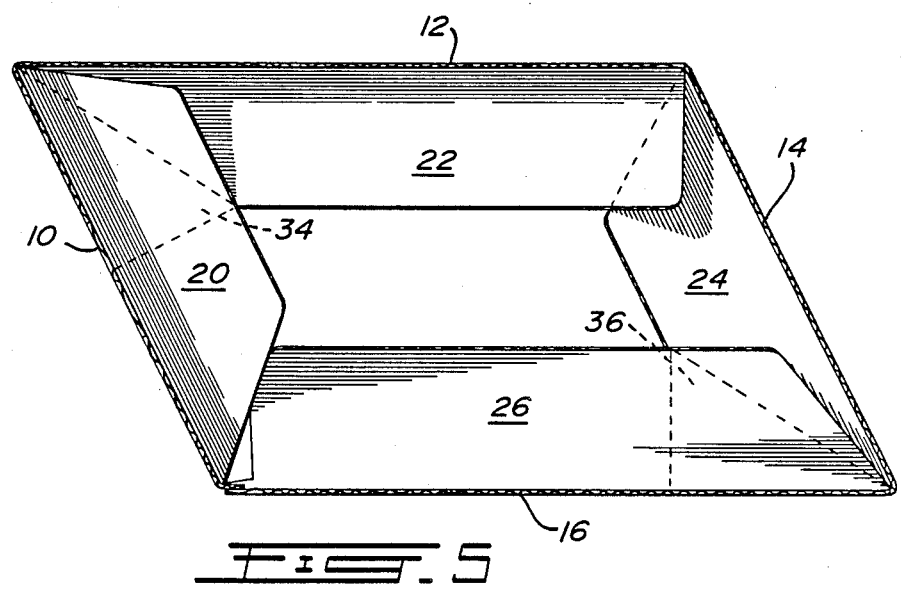

LITTER BOX WITH HANDLE AND BLANK THEREFOR

This application is a continuation-in-part, of application Ser. No. 081,689, filed 08/05/87 now abandoned.

FIELD OF THE INVENTION

This invention relates to shallow disposable litter boxes and to blanks for forming disposable litter boxes. This invention relates in particular to a disposable litter box with handle formed from a single blank, the box having a handle for releasably locking the top of the box, thus sealing the box, to enable carrying the box horizontally without touching the sides, ends or bottom of the box.

BACKGROUND OF THE INVENTION

Disposable litter boxes are well known in the industry of house pet accessories. The common type provides for a combination prepackaged litter container for display, opened for use by house pets (such as cats, rabbits, small dogs, etc) and ultimately closed for disposal. These litter boxes are relatively flat containers having short side and end walls which extend into bottom and top flaps for forming a bottom and a top respectively. The bottom flaps are folded and fastened and thus forms an open-top permanently rectangular container. A predetermined amount of litter is placed in the container and the top flaps are bent and fastened, usually with a strip of low bonding adhesive to permit the utlimate opening of the litter box for use by a house pet.

When the litter box is opened, the upstanding top flaps create an open-top container of considerable height to prevent litter from being kicked over the walls by the pet. It is found that young pets and small pets are unable to enter or jump into the high-walled litter box, rendering the litter box inconvenient for use by different sized pets.

After the litter box has sufficiently been used by a pet, the upstanding top flaps are folded over each other to enclose the used litter within and dispose of entirely. It is found that pet owners consider it undesirable to grasp a used litter box from the sides, ends or bottom in order to dispose of the box. Such boxes have been disclosed in U.S. Pat. No. 4,014,292 of Mar. 29, 1977 as invented by W. J. Coughlin and R. D. Fecci and U.S. Pat. No. 4,628,863 of Dec. 16, 1986 as invented by L. L. Eichenauer.

In order to overcome these difficulties experienced by pet owners, applicant is now providing a disposable litter box with a handle, for releasably locking the top flaps in a closed position, for sealing the box and enable carrying it in a horizontal position without touching the ends, sides or bottom of the box.

In a preferred embodiment of the invention, one of the top flaps when in upstanding position, provides an opening for different sized pets to enter and exit the open-top litter box. When the top flap with an opening is folded and locked with the other top flaps, a completely sealed box is still provided.

In another preferred embodiment, applicant provides a means to easily releasably lock the top flaps in upstanding position.

In yet another preferred embodiment of the invention, a means is provided wherein a box in the open-top position and having the bottom prefastened, is easily folded flat for compactness and opened up into the open-top position with bottom and vice versa.

BRIEF DESCRIPTION OF THE INVENTION

Broadly stated, the invention is directed to a blank and box therefrom having four wall panels foldably connected and defining opposed end walls and opposed side walls, each of said wall panels having a given height and extending several times said height into a foldably connected bottom panel, means of fastening each of said bottom panel to define a bottom for said box, whereby said wall panels and said bottom define a shallow container for receiving a litter or mat, each of said side walls extending several times said height away from said bottom panel, via a first fold line, into a foldably connected outer top panel, each said outer top panel having opposite end edges, each of said end walls extending several times said height away from said bottom panel via a second fold line into an inner top panel, each said inner top panel having opposite side edges, each of said side edges being adjacent one of said end edges, said each of said side edges intersecting said second fold line at a corner, said each of said side edges foldably connected to said adjacent one of said end edges to define a substantially rectangluar open-top box, in each of said inner top panel, originating from each of said corner, an oblique fold line subtending a substantially 45° angle with said second fold line and dividing each of said inner top panel into a substantially triangular panel with its base defined as said second fold line, said substantially triangular panel via each said oblique fold line being foldably connected to two wing panels, a first of said outer top panel having a cutout portion defining an elongated aperture, a second of said outer top panel, about an edge remote from said first fold line, having a foldable flap whereby upon inwardly folding each said outer top panel, said second of said outer top panel slides under said first of said outer top panel and said foldable flap is inserted into said elongated aperture to releasably lock said first and said second of said outer top panel into a top for sealing said box and define a handle for easily horizontally carrying said box with one hand without touching said wall panels and said bottom.

BRIEF DESCRIPTION OF THE DRAWINGS

Referring now to the drawings which illustrate the invention.

FIG. 4 is a perspective view of the fully closed, locked and sealed litter box of FIG. 2, with the carrying handle.

FIG. 5 is a perspective view of an erected blank as in FIG. 1, showing fastened bottom flaps permitting compact folding of a litter box in accordance with a particular embodiment of the invention.

Referring now to FIG. 1, the blank comprises four wall panels 10, 12, 14, 16 foldably connected in a series and preferably having a height of a dimension much less than their length. A manufacturer's joint 18 foldably connected to the first wall panel 10 or last wall panel 16 of the series (shown in FIG. 1 as foldably connected to wall panel 10) enables the first and last wall panels 10 and 16 respectively, to be joined and fastened with adhesive, staples, etc., in order to define a rectangular box.

Figure 2:
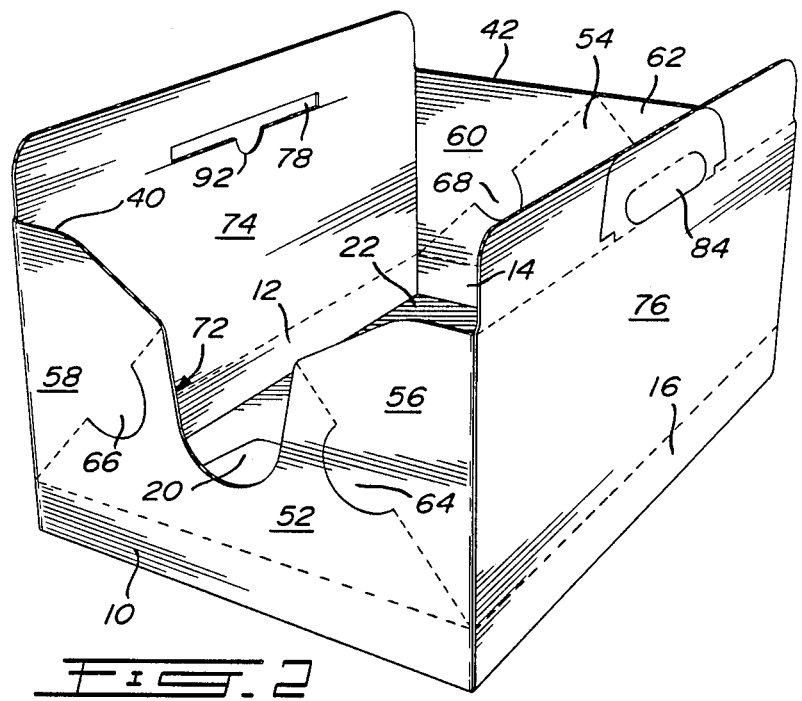
FIG. 2 is a perspective view of the erected blank as shown in FIG. 1.

In such a rectangular box as shown in FIG. 2, wall panels 10 and 14 are opposed and are considered as end walls, wall panels 12 and 16 also opposed and considered as side walls. Other means, such as an adhesive band, may be used to join and fasten the first and last wall panels 10 and 16 respectively, instead of manufacturer's joint 18.

Each of the wall panels 10, 12, 14, 16 extends, via a continuous fold line 19 across the blank, into a bottom panel 20, 22, 24, 26 respectively. The bottom panels extend several times the height of the wall panels 10, 12, 14, 16. Preferably said bottom panels are of a height H substantially equal to one half of a length L of the end walls 10,14. The bottom panels may be of rectangular or other configuration, overlapped and fastened in a common method to form the bottom of a box. However, the bottom panels are preferably in a configuration which enables them to be overlapped and fastened in a particular manner, to be described later, and thereby form a prefastened open-top box which may successively be folded flat for compactness and opened up into an open-top box with bottom and vice versa.

The following configuration of the bottom panels enables such successive folding and opening of a prefastened open-top box.

Each of the bottom panels 20, 22, 24, 26 has one edge remote from fold line 19 and substantially parallel with fold line 19. For each bottom panel, the remaining pair of opposite edges are preferably at angles of about 60° to 90° with fold line 19. This permits easier folding and opening of the prefastened open-top box.

Figure 1:
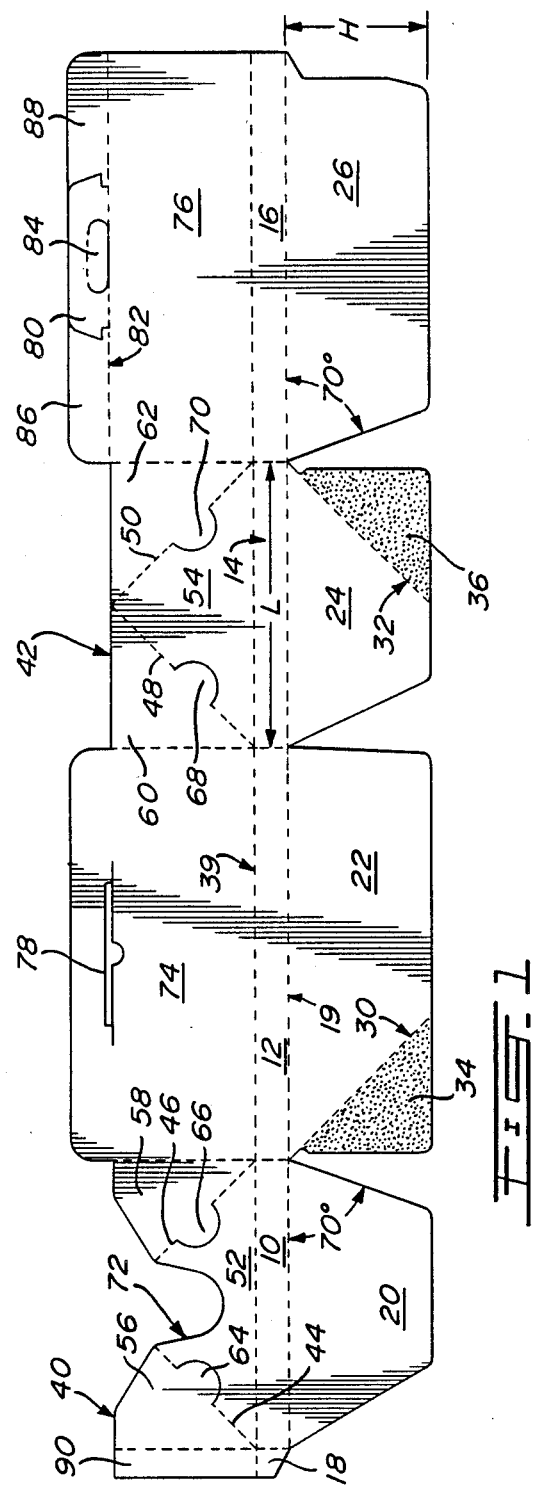
FIG. 1 is a plan view of a blank in accordance with a particular embodiment of the invention.

Two adjacent bottom panels are substantially of a rectangular or trapezoidal shape. These two adjacent bottom panels each have a diagonal fold line originating at the intersections of fold line 19 with the two free edges, of the two adjacent bottom panels, being farthest apart and therefore not adjacent. The diagonal fold lines must be at about a 45° angle with fold line 19 and thereby define substantially triangular glue flaps. In FIG. 1, the two adjacent bottom panels are shown as 22, 24. Diagonal fold lines 30, 32 define glue flaps 34, 36.

The remaining bottom panels, other than the aforementioned two adjacent bottom panels, are substantially of trapezoidal shape. In each of these remaining bottom panels, at least the one edge adjacent a glue flap, subtends an angle of preferably 75° or less with fold line 19. As shown in FIG. 1, the remaining bottom panels, being 20, 26, each have one edge adjacent a glue flap 34, 36 respectively at about a 70° angle with fold line 19.

When the blank is formed into a rectangular box, by fastening the first and last wall panels 10 and 16, the preferred bottom panels 20, 22, 24, 26 must be folded and fastened as follows. Bottom panel 26 is bent inwardly perpendicular to wall panel 16. Bottom panel 20 is bent inwardly and partially overlaps bottom panel 26. Bottom panel 22 is bent inwardly and partially overlaps bottom panel 20; glue flap 34 is fastened to bottom panel 20 with adhesive, staples, etc. Bottom panel 24 is bent inwardly and partially overlaps bottom panels 22, 26; glue flap 36 is fastened to bottom panel 26 with adhesive, staples, etc.

The open-top box thus formed is easily folded flat for compactness particularly by applying pressure at the intersections of wall panels 10, 16 and 12, 14. The bottom panels will automatically bend upwardly and inwardly. The box becomes diamond-shaped, as in FIG. 5, until bottom panels 22, 26 lie flat against each other, the prefastened box thereby being flat and compact. The box is then opened up in particular by separating and pushing wall panels 10, 16 away from each other, or by applying pressure at the intersections of wall panels 10, 12 and 14, 16 until the box is rectangular. The fastened bottom flaps automatically bend downwardly and form the bottom of the box.

End walls 10, 14 extend via fold line 39 across the blank into a foldably connected inner top panel 40, 42 respectively. Inner top panels 40, 42 have a height several times the height of wall panels 10, 12, 14, 16. In each inner top panel 40, 42, fold lines 44, 46 and 48, 50 respectively are at about 45° angles with fold line 39 thereby defining substantially triangular panels 52, 54 with their base identical with fold line 39. The substantially triangular panels 52 and 54 are foldably connected via fold lines 44, 46 and 48, 50 to wing panels 56, 58 and 60, 62 respectively. Preferably, dividing each of the fold lines 44, 46, 48, 50 is at least one substantially semi-circular tab 64, 66, 68, 70 respectively. The tabs 64, 66, 68, 70 are shown as being extensions of wing panels 56, 58, 60, 62 cut out of inner panels 52, 54 however, the tabs may be extensions of inner panels 52, 54 cut out of the wing panels.

The fold lines 44, 46, 48, 50 are discontinuous and must not extend across the tabs. The diameter of the tabs and the length of the fold lines 44, 46, 48, 50 are preferably at a ratio of 1:3 to 1:5, the diameter of the tabs preferably being at least 2 inches. Thus the tabs will be of sufficient rigidity to releasably lock the inner panels and wing panels into unbent inner top panels 40, 42 by snugly sliding into and out of their identical cut out portions. The sufficient rigidity will ensure the semi-circular tabs dont't bend at their base when they are repetitively locked and unlocked.

Preferably, one of the inner top panels 40, 42 has a cut out portion defining an opening 72 (shown in inner top panel 40). Opening 72 is preferably symmetrical, wide in its uppermost part and narrows to its lowermost part, the lowermost part preferably being at least below the horizontal center line of inner top panel 40. The axis of symmetry is preferably about the vertical center line of the inner top panel 40.

Side walls 12, 16 extend via fold line 39 into outer top panels 74, 76 having a height several times the height of side walls 12, 16. Preferably outer top panels 74, 76 have a height of a dimension greater than one half the length L of end walls 10, 14.

Outer top panel 74 is foldably connected on opposite edges to the adjacent wing panels 58, 60. Outer top panel 76 is foldably connected to wing panel 62. In order to erect the blank, the inner top panel 40 and outer top panel 76 are fastened together by a manufacturer's joint 90 foldably connected to a first of the two abovementioned panels and secured with adhesive, staples, etc. to a second of the two panels 40 and 76. In FIG. 1, manufacturer's joint 90 is shown foldably connected to inner top panel 40. Other means such as an adhesive band may be used to fasten the inner top panel 40 and outer top panel 76.

One of the outer top panels 74, 76 has a cut out portion defining an elongated aperture 78. The other of outer top panels 74, 76, about an edge remote from fold line 39, has a handle 80 foldable at fold line 82 and having a cut portion preferably defining a foldable flap 84. Foldable flap 84 when bent, defines an aperture for finger insertion.

Fold line 82 preferably extends across outer top panel 76 defining seal flaps 86, 88. Seal flaps 86, 88 may be joined by an extension above handle 80 if desired.

To erect the blank of FIG. 1, the first and last of the wall panels 10, 12, 14, 16 foldably connected in a series are fastened together as described earlier to form an open-top rectangular shallow box as in FIG. 2. Bottom panels extending from each of the wall panels are overlapped and fastened to form a bottom as previously described.

Inner top panels 40, 42 and outer top panels 74, 76 are open and in upstanding position. The preferred tabs 64, 66, 68, 70 snugly fitting into identical cut out portions inhibit the substantially triangular panels 52 and 54 and the wing panels 56, 58 and 60, 62 respectively from folding, thereby releasably locking the inner top panels 40, 42 and outer top panels 74, 76 in upstanding position.

Opening 72 is preferably spaced a short distance, from wall panel 10, of about the same height as wall panel 10, and defines an entry and exit way for different sized pets, from young usually short and skinny pets to older usually taller and wider pets. Opening 72, being but a partial opening in the upstanding tall inner top panels 40, 42 and outer op panels 74, 76 will still keep litter from being kicked out of the box to a minimum. Furthermore, opening 72 does not hinder the functioning of tabs 64, 66, 68, 70 for releasably locking the inner top panels 40, 42 in upstanding position.

An amount of loose litter or prepackaged litter is usually inserted into the open-top box, the box later closed to seal in the litter as will be later described. The box may however be used as a sleeping place for pets by inserting a piece of carpet, newspaper, cloth or other (to be designated as a mat) to provide comfort to a pet.

Figure 3:
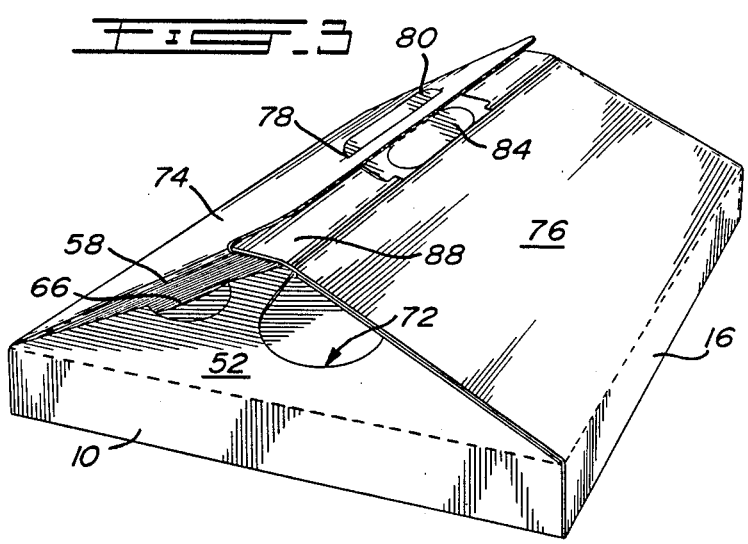
FIG. 3 is a perspective view of the partially closed litter box of FIG. 2, to more clearly illustrate the releasably locking handle means.

Now referring to FIG. 3, the box of FIG. 2 is closed and sealed by inwardly folding substantially triangular panels 52, 54. Wing panels 56, 58 and 60, 62 will fold, unlocking tabs 64, 66 and 68, 70 respectively, and thereby inwardly fold outer top panels 74, 76.

When outer top panels 74, 76 near each other and start to overlap, outer top panel 76 is inserted under outer top panel 74. Seal flap 88 (and similar for seal flap 86) is inserted between outer top panel 74 and wing panel 58. Handle 80 is inserted upwardly into aperture 78. A small cut out portion 92 (shown in FIG. 2) along aperture 78 enables one's finger to be inserted within aperture 78 to ease the sliding of handle 80 into aperture 78.

Now referring to FIG. 4, a completely closed and sealed box is shown. Handle 80, snugly fitting into aperture 78, releasably locks the outer top panels 74, 76 to lie flat against the end walls 10, 14, enclosing the contents of the box. Note opening 72 is completely sealed. Handle 80 may lie flat against outer top panel 74 permitting boxes to be stacked on top of each other.

Handle 80 and aperture 78 are preferably centered in the top of the box to enable the box to be carried in a horizontal position by folding handle 80 upright and inserting one's fingers into the hand grasping aperture defined by flap 84. Flap 84 thereby provides a strengthened and comfortable upper surface for the hand grasping aperture. The box now closed and sealed may be disposed of by carrying it with handle 80, avoiding touching the ends, sides and bottom of the box.

The box and blank are preferably of corrugated fibreboard, disposed of after approximately a week's use, thereby being particularly convenient for pet owners who go away from home for short periods of time and wish to bring their pets and for pet owners who find it undesirable to regularly clean a litter container and renew the litter within.

Having described the invention, modifications will be evident to those skilled in the art without departing from the spirit of the invention, as defined in the appended claims.

I claim:

1. A disposable litter box having four wall panels foldably connected and defining opposed end walls and opposed side walls, each of said wall panels having a given height and extending several times said height into a foldably connected bottom panel, means of fastening each of said bottom panel to define a bottom for said box, whereby said wall panels and said bottom define a shallow container for receiving a litter or mat, each of said side walls extending several times said height away from said bottom panel, via a first fold line, into a foldably connected outer top panel, each said outer top panel having opposite end edges, each of said end walls extending several times said height away from said bottom panel via a second fold line into an inner top panel, each said inner top panel having opposite side edges, each of said side edges being adjacent one of said end edges, said each of said side edges intersecting said second fold line at a corner, said each of said side edges foldably connected to said adjacent one of said end edges to define a substantially rectangular open-top box, in each of said inner top panel, originating from each of said corner, an oblique fold line subtending a substantially 45° angle with said second fold line and dividing each of said inner top panel into a substantially triangular panel with its base defined as said second fold line, said substantially triangular panel via each said oblique fold line being foldably connected to two wing panels, a first of said outer top panel having a cutout portion defining an elongated aperture, a second of said outer top panel, about an edge remote from said first fold line, having a foldable flap whereby upon inwardly folding each said outer top panel, said second of said outer top panel slides under said first of said outer top panel and said foldable flap is inserted into said elongated aperture to releaseably lock said first and said second of said outer top panel into a top for sealing said box and define a handle for easily horizontally carrying said box with one hand without touching said wall panels and said bottom.

2. The box as defined in claim 1 wherein each of said oblique fold line is discontinuous and stops short of a means to releasably lock said substantially triangular panel and said wing panels in upstanding position to define said open-top box.

3. The box as defined in claim 2 wherein said means to releasably lock in upstanding position is at least one substantially semi-circular tab extending from each of said wing panels about a discontinuous area of said discontinuous fold line and toward said substantially triangular panel, said substantially triangular panel having corresponding substantially semi-circular cutout portions enabling each of said substantially semi-circular tab to slide snugly and thereby releasably lock within said semi-circular cutout portions, and wherein the ratio of the diameter of said semi-circular tab to the length of said oblique fold line is in the range of about 1:3 to 1:5, to enable said tab's rigidity for multiple use.

4. The box as defined in claim 1 wherein one of said inner top panel has a cutout portion, said cutout portion being wide about an edge remote from said second fold line and narrowing to a point in said one of said inner top panel, thereby defining an entry and exit way for different-sized pets to use said litter box.

5. The box as defined in claim 4 wherein said cutout portion narrows to a point below the horizontal center of said one of said inner top panel.

6. The box as defined in claim 4 wherein said cutout portion narrows to a point spaced from said second fold line by about said height of said wall panels.

7. The box as defined in claim 1 wherein a pair of adjacent bottom panels, at their farthest remote edge having a substantially triangular glue flap, the remaining pair of said bottom panel each being trapezoidal, whereby each said bottom panel on overlapping to make said bottom, each said glue flap is fastened to a juxtaposed bottom panel to form a fastened bottom, and enabling said fastened bottom to fold inwardly and said box to lay flat and compact.

8. A blank for forming a disposable litter box, said blank having a first wall panel, said first wall panel extending into a foldably connected second and third wall panels remote from each other, said third wall panel extending away from said first wall panel into a foldably connected fourth wall panel, each of said wall panels having a given height, a means to fasten said first and fourth wall panels to define a rectangular box with opposed end walls and opposed side walls, each of said wall panels extending several times said height into a foldably connected bottom panel, means of fastening each of said bottom panel to define a bottom for said rectangular box, whereby said wall panels and said bottom define a shallow container for receiving a litter or mat, each of said side walls extending several times said height away from said bottom panel, via a first fold line, into a foldably connected outer top panel, each said outer top panel having opposite end edges, each of said end walls extending several times said height away from said bottom panel via a second fold line into an inner top panel, each said inner top panel having opposite side edges, each of said side edges intersecting said second fold line at a corner, each of said side edges foldably connected to one of said end edges to define a substantially rectangular open-top box, in each of said inner top panel, originating from each of said corner, an oblique fold line subtending a substantially 45° angle with said second fold line and dividing each of said inner top panel into a substantially triangular panel with its base defined as said second fold line, said substantially triangular panel via each said oblique fold line being foldably connected to two wing panels, a first of said outer top panel having a cutout portion defining an elongated aperture, a second of said outer top panel, about an edge remote from said first fold line, having a foldable flap whereby upon inwardly folding each said outer top panel, said second of said outer top panel slides under said first of said outer top panel and said foldable flap is inserted into said elongated aperture to releasably lock said first and said second of said outer top panel into a top for sealing said box and define a handle for easily horizontally carrying said box with one hand without touching said wall panels and said bottom.

* * * * *

UNITED STATES PATENT AND TRADEMARK OFFICE
CERTIFICATE OF CORRECTION

PATENT NO. : 4,782,788

DATED : Nov. 8, 1988

INVENTOR(S) : Marcel Arcand

It is certified that error appears in the above-identified patent and that said Letters Patent is hereby corrected as shown below:

ON THE TITLE PAGE:

Assignee should read: Domtar Inc.

Signed and Sealed this

Fourteenth Day of March, 1989

Attest:

DONALD J. QUIGG

*Attesting Officer*   *Commissioner of Patents and Trademarks*